United States Patent [19]

Freeman, Jr.

[11] 4,050,365
[45] Sept. 27, 1977

[54] AIR DISTRIBUTION ASSEMBLY

[75] Inventor: Eugene J. Freeman, Jr., Tampa, Fla.

[73] Assignee: Ever-Wear Products, Inc., Tampa, Fla.

[21] Appl. No.: 705,624

[22] Filed: July 15, 1976

[51] Int. Cl.² .............................................. G03C 9/00
[52] U.S. Cl. ..................................... 98/40 C; 62/407
[58] Field of Search .......... 98/40 C, 40 D, 6, DIG. 7; 138/106, 107; 62/239, 407

[56] References Cited

U.S. PATENT DOCUMENTS

| | | | |
|---|---|---|---|
| 2,222,497 | 11/1940 | Bins | 138/107 |
| 2,551,751 | 5/1951 | MacDougall | 98/DIG. 7 |
| 3,159,090 | 12/1964 | Schutt | 98/40 D |
| 3,276,349 | 10/1966 | Person | 98/40 D |
| 3,353,663 | 11/1967 | Kayser et al. | 24/204 |
| 3,505,772 | 4/1970 | Declaire et al. | 24/204 |
| 3,526,867 | 9/1970 | Keeler | 24/204 |
| 3,557,413 | 1/1971 | Engle | 24/204 |
| 3,792,595 | 2/1974 | Willis | 62/407 |

FOREIGN PATENT DOCUMENTS

| | | | |
|---|---|---|---|
| 1,208,864 | 1/1966 | Germany | 98/40 C |

Primary Examiner—William E. Wayner
Assistant Examiner—Robert Charvat
Attorney, Agent, or Firm—Duckworth, Hobby, Orman, Allen & Pettis

[57] ABSTRACT

An air distribution assembly primarily designed to distribute conditioned air, for cooling or the like within a defined space such as a truck body or railroad car. The assembly includes an air conduit of elongated or otherwise predetermined configuration extending along a wall surface of the defined space and including one or more vents formed therein. Each one of the vents is defined by a flap removably disposed from the air conduit itself so as to define an aperture from which the conditioned air is distributed from the conduit into the defined space. Connection elements each comprising two connector portions are mounted on the air conduit for removable attachment to the wall surface of the defined space and also mounted in removable, interconnecting relation between the vent flap and the surrounding edge of the aperture defined by the vent flap so that the various flaps can be displaced or disposed in closed relation thereby regulating the distribution of air within the defined space.

4 Claims, 9 Drawing Figures

AIR DISTRIBUTION ASSEMBLY

BACKGROUND OF THE INVENTION

1. Field of the Invention

This invention relates to an air distribution conduit made from flexible material of the type designed to be removably attached at predetermined locations within a defined space so as to regulate the distribution of conditioned air throughout the defined space by a conduit capable of being either installed or removed through detachable connection through a wall surface within the defined space.

2. Description of the Prior Art

Over the past many years the transportation industry has grown proportionally with the rapidly increasing population and the demand of this increased population for various items. Food products as well as other similar type goods such as flowers, etc., encounter particular problems irrespective of the relative distances these products have to be transported. Certain perishable items such as food, etc., naturally have to be refrigerated and/or subjected to a constant flow of conditioned, refrigerated air to maintain their freshness and increase the length of time before which they become spoiled or useless.

While refrigerated or air conditioned vehicles are, of course, very well-known in the transportation industry there is a recognized problem with such vehicles in accomplishing efficient and effective air distribution throughout the defined space of the truck or railway car type vehicle. Conventionally, the air conditioned vehicle bodies included one or more vents built into the vehicle body itself and located at one removable or fixed location in the vehicle body. This obviously resulted in a lack of efficient and effective air distribution throughout the entire length of the body which in turn made it more difficult to refrigerate or allow proper exposure for all products or goods located at various locations throughout the vehicle body.

In order to overcome this problem certain vehicle bodies have built therein rigid, permanent or fixed air conduits wherein the conduits included one or more vents in order to define more efficient or effective air distribution throughout the defined space of the vehicle body. However, in structuring such air conduit it was found that such conduits were subjected to an unusual amount of damage especially in vehicles where mass loading took place through forklift trucks, etc. Commonly the operators of such fork-lift or like loading vehicles would inadvertently collide with such fixed conduits causing their damage and possible inoperativeness without extensive repair and maintenance.

Accordingly, it can readily be seen that there is a need in the transportation industry for an effective air distribution assembly which can be readily adapted and structured for use in a vehicle so as to deliver cooled or conditioned air throughout the defined space of the vehicle. Such air distribution assembly should include conduit structures capable of being easily mounted and/or detached and which overcome the inherent danger or problem of damage due to mass vehicle loading of goods within the defined space of the vehicle.

Such an air distribution assembly should be capable of easy installation and removal, low maintenance costs while at the same time being relatively inexpensive to construct and initially purchase.

SUMMARY OF THE INVENTION

This invention relates to an air distribution assembly of the type primarily designed to be utilized with conventional sources of conditioned air and be mounted within the space defined in vehicles. Such vehicles may include truck bodies, railway freight cars, airplanes, etc. More particularly, the air distribution assembly of the present invention comprises a conduit means of elongated or otherwise predetermined configuration disposed in communicating and distributing relation with a source of conditioned air. The conduit means comprises a base portion directly connected in fluid communication with such a conventional source of air such as an air conditioner or the like and extending outwardly therefrom in a predetermined configuration as set forth above.

An important structural feature of the present invention includes the manufacturing or forming of the conduit means from a flexible material such as vinyl, heavy duty plastic, or the like. As will be set forth in greater detail hereinafter such flexible material used in the formation of the conduit means has the added advantage of allowing its rapid and relatively easy installation or removal. Also inadvertent collision of the conduit means with goods being loaded or loading vehicles accomplishing such loading results in less damage thereto again, as will be explained in greater detail hereinafter.

A plurality of connection means are mounted on the conduit means about at least a portion of the length of its periphery. Each connection means comprises two connector portions one of which is formed directly on the conduit means while the other of which is mounted on the wall surface of the defined space of the vehicle. Each connector portion of each connection means is disposed, configured and dimensioned for interchangeable engagement with the other connector portions of other connection means. In addition each connector portion is specifically structured and configured to create a "snap" removable interconnection with the other connector portion thereby allowing the conduit means to readily be removably mounted on any wall surface of the defined space within the vehicle. As set forth above this also prevents or greatly reduces the amount of damage caused by inadvertent collision of the conduit means with goods being loaded. In the case of such a collision the portion of the conduit means engaged merely "rips away" since the connector portions attached to one another and to the conduit means and to the wall surface merely readily separates and "gives way" thereby eliminating tearing, or other harmful results.

In one embodiment of the present invention one connector portion of each of the plurality of connection means are disposed in spaced relation to one another on the wall surface of the defined space in a predetermined pattern. Similarly, the opposite connector portions of each of the plurality of connection means are disposed in a similar pattern or configuration but attached to the conduit means. Attachment or mounting of the conduit means merely requires the interengagement of the various connector portions or the various connection means in a "snap on" like engagement as briefly set forth above.

The conduit means of the present invention further comprises at least one and preferably a plurality of vent means arranged along the length or over the surface area of the predetermined configuration of the conduit means. Specifically, each of the vent means comprises a vent flap removably attached to the conduit means by the same structured connection means as set forth above with regard to the manner of attachment of the conduit means itself to the wall surface of the space defined within the vehicle. The removal of each vent flap causes the exposure of an aperture means disposed in intercommunicating relation between the exterior of the conduit means and the interior of the conduit means. Therefore, the conditioned air readily exits from this vent means and is evenly distributed throughout the area designed for coverage by the conduit means.

In operation, the defined space of the vehicle body is adequately serviced by the installation of the conduit means of the present invention. Connector portions of each of the plurality of connection means are mounted on a given wall surface in a predetermined arranged configuration or pattern. Since these connector portions are spaced apart from one another an equal, predetermined distance, the connector portions of each of the plurality of connection means, formed on the conduit means are also equally spaced from one another this same distance. Once the various connector portions are mounted installation of the conduit means itself merely requires the "snap fit" engagement of the corresponding connector portions which define each of the plurality of connection means.

Opening or closing of the desired vent means also merely occurs by disconnecting, or connecting the various connector portions of the connection means associated with each of the vent means and being connected respectively to the vent flap or about the aperture means incorporated in the vent means and exposed by the displacement of the vent flap.

If, during loading, the conduit means is inadvertently contacted or collided with the connector portions of the correspondingly positioned connection means merely "give way" causing disengagement of that portion of the conduit means from the associated wall surface. Since no effective resistance of the conduit means is given there is generally no ripping, severing or permanent damage done to the conduit means itself.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature nd objects of the invention, reference should be had to the following detailed description taken in connection with the accompanying drawings in which.

Similar reference characters refer to similar parts throughout the several views of the drawings.

DETAILED DESCRIPTION

Figure 1:
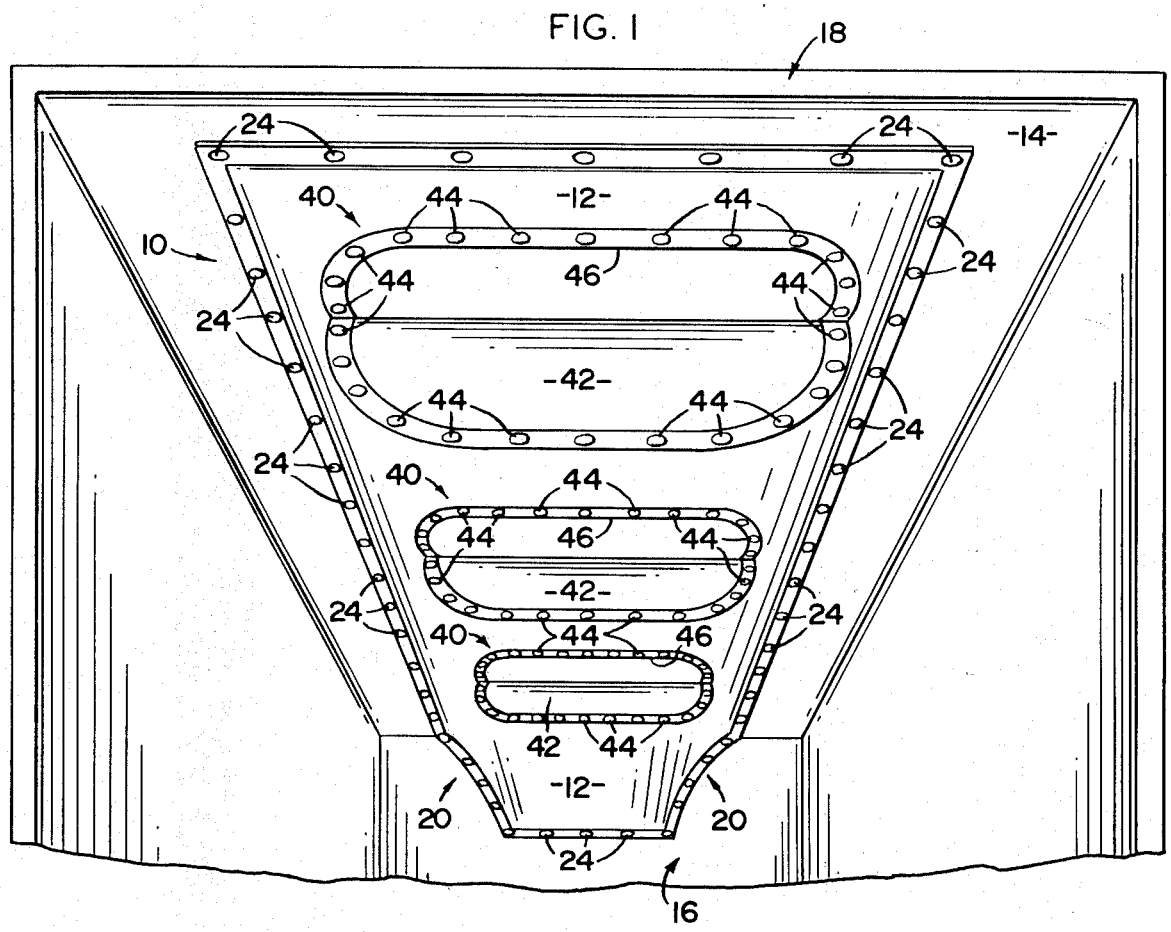
FIG. 1 is a perspective view of the conduit means of the present invention with vent means formed therein and placed in a defined space of a vehicle or like structure.
Figure 2:
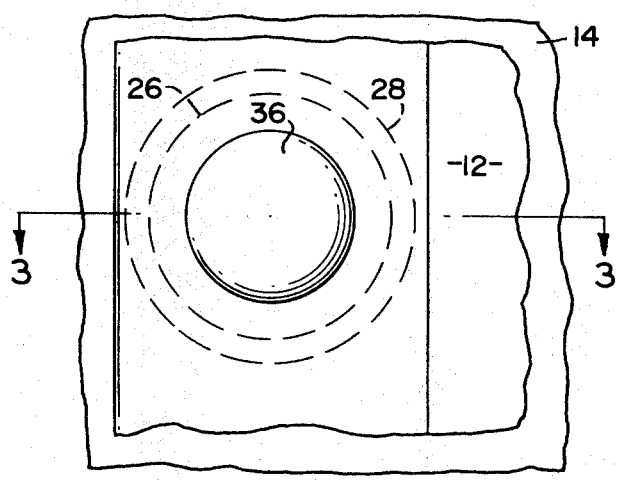
FIG. 2 is a front view of the exterior of a connector portion of a given connection means.

As shown in FIG. 1 the air distribution assembly of the present invention is generally indicated as 10 and includes a conduit means 12 formed from a flexible material such as vinyl, heavy duty plastic, canvas, etc. The aforementioned flexible materials are set forth as being representative only and are not intended to be an all inclusive listing of the flexible materials possible for applicable, efficient utilization and formation of the conduit means 12.

As shown in FIG. 1 the conduit means 12 is ideally suited for placement on a wall surface 14 which defines part of an interior space 16 within a vehicle or the like 18. More specifically, the vehicle 18 may be a truck body, railway car, airplane or any type defined space which is normally intended for the storage and/or transportation of various perishable goods or items. However, it should be noted that the subject matter of the present invention is not limited for use within a defined space of a vehicle. To the contrary the air distribution assembly of the present invention is capable of being used in combination with any conditioned air source for any storage area wherein efficient and effective air distribution is desired.

Figure 3:
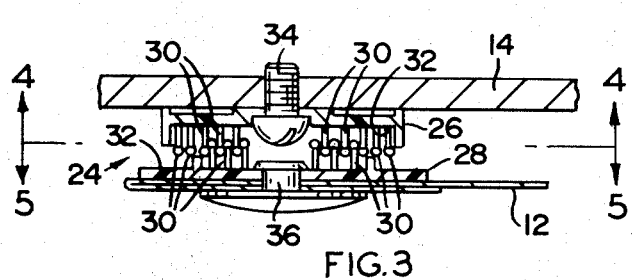
FIG. 3 is a sectional view taken along line 3-3 of FIG. 2 showing the relative structural features of the connector portions comprising the connection means.
Figure 4:
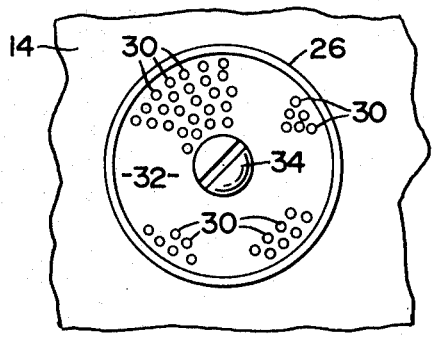
FIG. 4 is a sectional view taken along line 4-4 of FIG. 3 showing additional structural features of the embodiment of FIG. 3.
Figure 5:
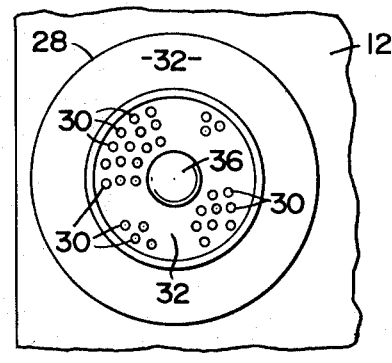
FIG. 5 is a view taken along line 5-5 of FIG. 3 showing corresponding structural features of the cooperatively positioned connector portions of the connection means.

As shown in FIG. 1 the conduit means 12 comprises a base portion generally indicated as 20 which is specifically designed and configured to be connected in fluid communicating relation with a source of conditioned air or the like (not shown). In the embodiment shown in FIG. 1 the base means 20 is disposed in covered, surrounding or overlapping relation to a vent or actual source of conditioned air which may be permanently affixed within the defined space 16 of the vehicle 18. From this point the conduit means 12 extends outwardly in a predetermined configuration along a wall surface 14. As shown in FIGS. 2-5 in detail and in FIG. 1 with relation to the conduit means 12, a plurality of connection means generally indicated as 24 are disposed about at least a portion of the peripheral edge of the conduit means 12. As best shown in FIG. 3 each of the connection means includes at least two connector portions 26 and 28. One of the connector portions 28 is secured to the conduit means 12 wherein the opposite of the connector portions is connected to the wall surface 14. Each of the connector portions of each connection means comprises a plurality of fingers 30 integrally attached and extending outwardly from a platform member 32. Conventional attachment elements such as a threaded screw 34 or plastic staple 36 are used to interconnect the platform member 32 to the respective conduit means and/or surface portion 14. The specific disposition and configuration of the fingers 30 allow for the convenient, "snap fit" removably engageable interconnection between the two connector portions 26 and 28. Accordingly, by virtue of the placements of the various connection means 24 substantially around the peripheral edge of the conduit means 12, it can be easily mounted or removed from the wall surface 14 and also prevents or greatly reduces the possibility of damage of the conduit means itself if accidentally collided with a loading vehicle as will be explained in greater detail hereinafter.

The conduit means of the present invention further comprises one or more vent means generally indicated as 40. Each of the vent means 40 incorporates a vent flap 42 connected to the conduit means 12 by connection means 44 which is defined by the same structure as set forth with regard to the embodiment of FIG. 3 and therein designated as connection means 24. Accordingly, the vent flap 42 is easily detached from the conduit means 12 and thereby at least partially defines an aperture 46 which is disposed in fluid communicating relation between the interior of the conduit means 12 and the exterior thereof or the space 16 when displacement or removal of the vent flap 42 occurs. It should accordingly be clear that disposition of the vent flap 42 either in its open position as shown or in its closed position helps regulate and/or control the specific distribution of conditioned air throughout the defined space 16 of the vehicle or like structure 18.

Figure 6A:
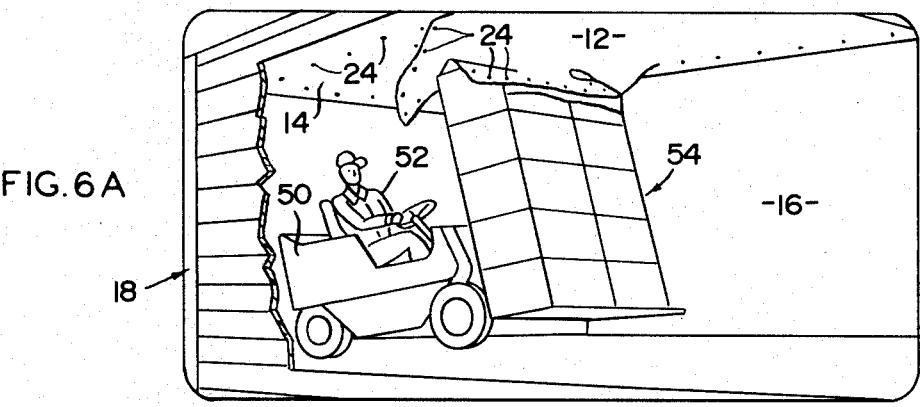
FIGS. 6a, 6b and 6c are pictorial representations in isometric view of the operational characteristics and advantages of the subject invention.
Figure 6B:
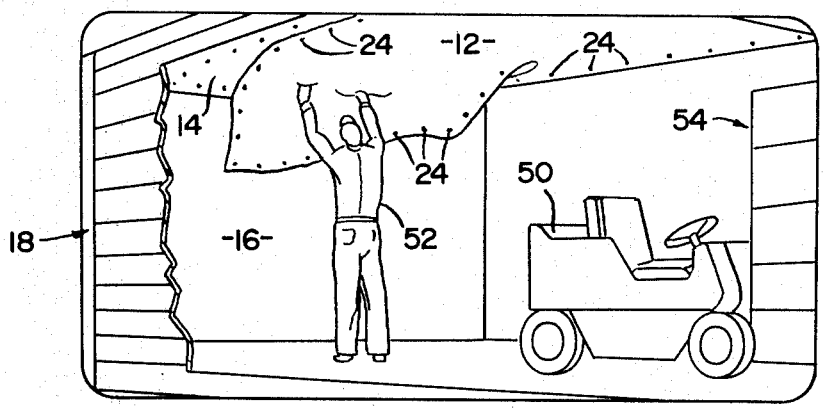
Figure 6C:
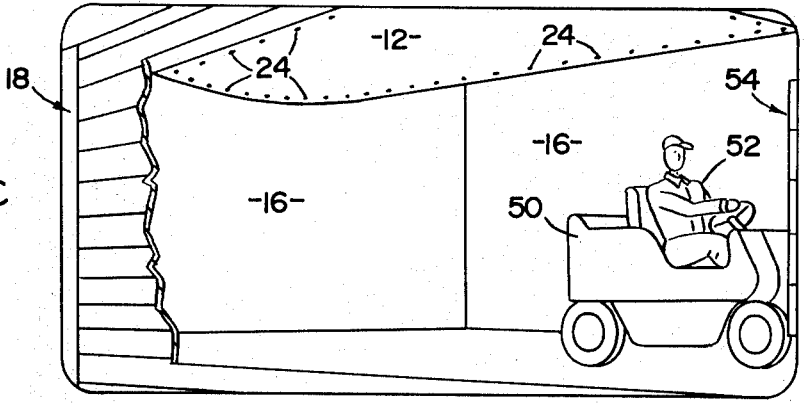

With regard to FIGS. 6a, b and c, an important structural feature of the present invention allows the elimination or reduction of damage to the conduit means during periods of loading or unloading cargo, products, goods, etc. In particular in large type vehicle bodies 18 the inner space 16 defined by the vehicle body is usually large enough to accommodate loading vehicles 50 wherein operators 52 can simultaneously load and/or unload numerous or mass products generally indicated as 54. With particular reference to FIGS. 6a and 6b inadvertent collision often times occurs through misjudgment of the operator 52 between the goods 54 and the conduit means 12. When utilizing conventional or prior art conduit structures the damage caused by such an inadvertent collision would be sufficient to cause major repair and obvious down time of the vehicle resulting in loss of both travel time and labor time. However, with the structure of the present invention the conduit means 12 is merely replaced on surface 14 through the interengagement of the connection means 24.

As set forth above due to the "snap fit" interconnection between the connection portions 26 and 28 there is insufficient resistance of the conduit means 12 to the products or goods 54 when an inadvertent collision results. Therefore, rather than tearing, being deformed or otherwise being damaged the conduit means 12 is merely separated from the surface 14 as the connection means 24 gives way by separation of the various connector portions 26 and 28.

Figure 7:
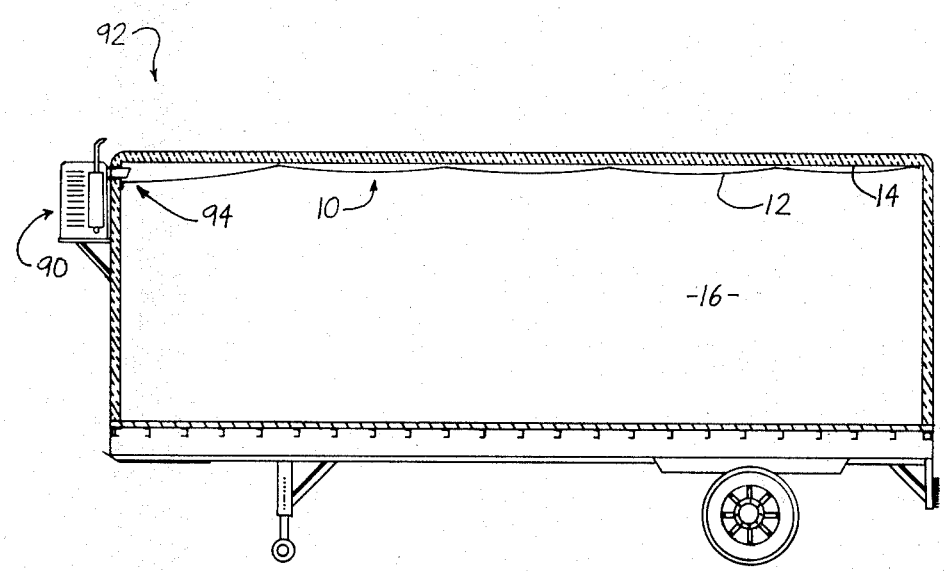
FIG. 7 is an interior sectional view of an air source used in combination with the conduit means of the present invention.

FIG. 7 is directed to a pictorial representation of the conduit assembly generally indicated as 10 of the present invention attached to the interior of a defined space 16 and has conduit means 12 mounted on a wall surface 14 which at least in part defines the defined space 16. An air source generally indicated as 90 is shown mounted on the vehicle generally indicated as 92 or other structure in which the conduit means 12 is mounted and operational. The air source 90 is disposed in fluid intercommunicating relation to the conduit means 12 as indicated generally at 94. Accordingly, conditioned air is directed from the air source 90 through the conduit means so as to be dispersed throughout the defined space 16 in the manner described above. It should be noted at this point, however, that the representation of the air source 90 being included in direct communicating relation with the conduit means 12 is representative only and provided for purposes of clarity. The air source means 90 does not comprise an integral portion of the present invention as described above that various structural applications of the air source 90 and means of attachment of the air source 90 to the conduit means 12 may be utilized to effect the efficient operation of the present invention.

It will thus be seen that the objects made apparent from the preceding description are efficiently attained, and since certain changes may be made in carrying out the above method and article without departing from the scope of the invention,, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described,

What is claimed is:

1. An air distribution assembly of the type primarily designed to disperse air at predetermined locations throughout a defined space, said air distribution assembly comprising: conduit means formed from a substantially flexible material and comprising base means disposed in fluid communicating relation with a source of conditioned air; connection means attached at least in part to said conduit means and being disposed and configured for mounting of said conduit means on a wall surface, said connection means each comprising two connector portions, one of said connector portions being attached to said conduit means and the other of said connector portions of a given connection means being attached to the wall surface of the defined space, each of said two connector portions dimensioned and configured for removable attachment to one another, a plurality of said connection means being mounted in spaced relation to one another along a major portion of the peripheral edge of said conduit means; and at least one vent means formed in said conduit means and disposed in interconnecting fluid communication between the interior of said conduit means and the defined space, said vent means comprising a vent flap and aperture means formed in said conduit means and defined by removal and displacement of said vent flap externally of said conduit means, at least one of said plurality of said connection means attached to said vent means, one of said connector portions being attached to said vent flap and the other of said connector portions being attached to the surrounding portion of said conduit means defining said aperture means and disposed thereon in engageable relation to said one connector portion of said vent flap; wherein each said connector portion of each said connection means comprises a platform portion, a plurality of fingers extending outwardly from said platform portion and in laterally spaced relation to one another, each of said plurality of fingers on each said platform portion outwardly extending in substantially parallel relation to one another, said fingers on each said platform portion being configured and dimensioned for engagement with said fingers of the oppositely disposed of said connector portions, whereby two connector portions defining a connection means are removably engageable with one another.

2. An air distribution assembly as in claim 1 further comprising a plurality of vent means disposed in spaced relation to one another along the length of said conduit means, each of said vent means comprising a vent flap, aperture means formed in said conduit means and defined by removal and displacement of said vent flap; said plurality of connection means attached to said vent means, one connector portion of each connection means attached to said vent flap, the other of said connector portions attached to the surrounding portion of said conduit means and disposed thereon in engageable relation to said one connector portion on said vent flap of each connection means.

3. An air distribution assembly as in claim 2 wherein a plurality of said connection means are attached about a major peripheral portion of said vent flap, one of said two connector portions of each connection means being mounted in spaced relation about a peripheral edge of said vent flap and the other of said connector portions of a given connection means mounted on a peripheral edge of the aperture means defined by said vent flap.

4. An air distribution assembly as in claim 3 wherein each corresponding connection means is disposed in spaced relation to one another on said vent means, and each connector portion mounted on said conduit means surrounding said aperture means being disposed in spaced relation from one another an equal distance as the connector portions on said vent flap, whereby connector portions of each connection means mounted on said vent means are disposed in interchangeable connectable relation with oppositely disposed connector portions of other connection means.

* * * * *